Inventor
James W. Bryce
By his Attorneys
Cooper, Kerr & Dunham

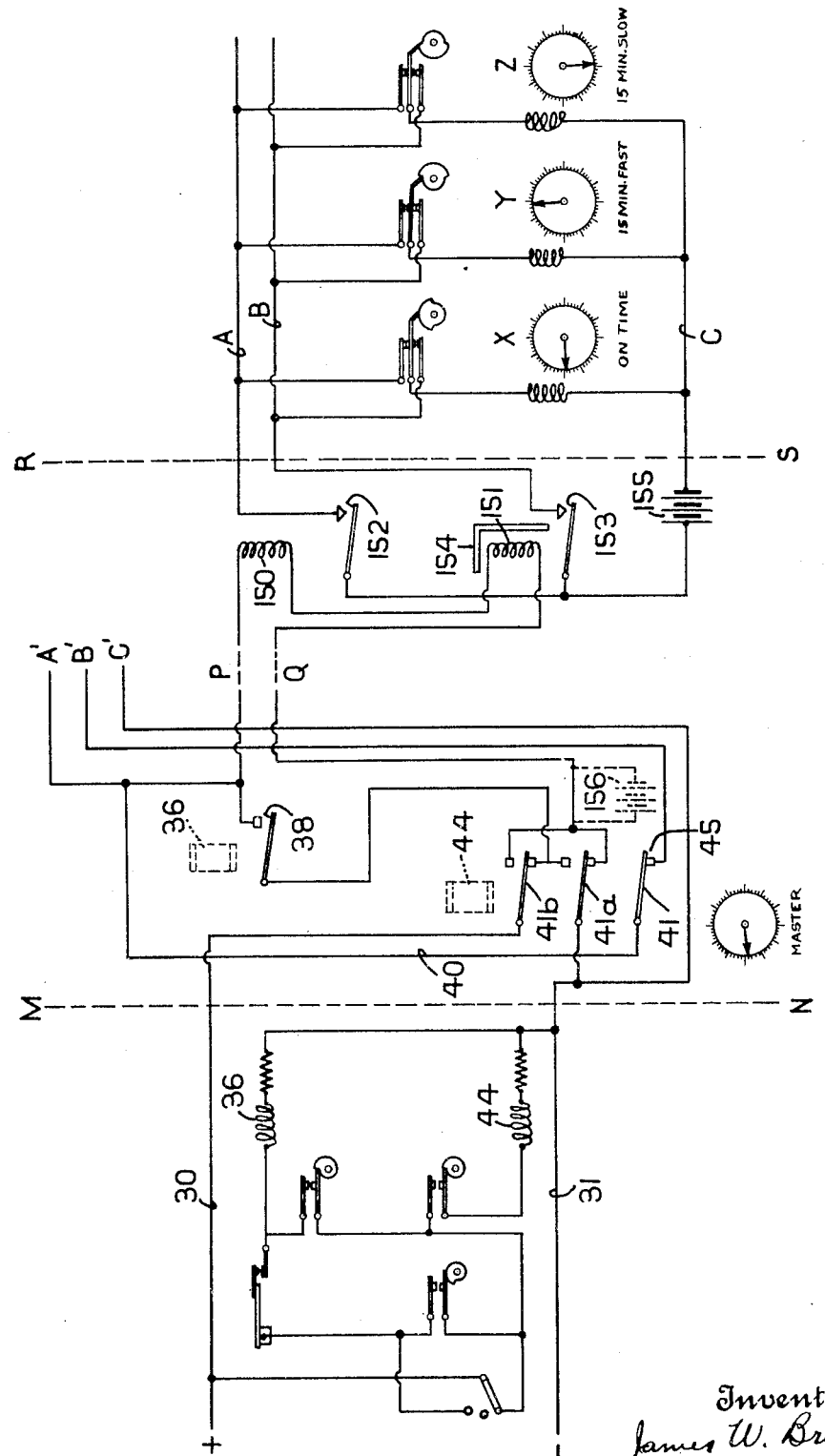

Patented May 9, 1933

1,908,112

UNITED STATES PATENT OFFICE

JAMES W. BRYCE, OF BLOOMFIELD, NEW JERSEY, ASSIGNOR TO INTERNATIONAL TIME RECORDING COMPANY, OF ENDICOTT, NEW YORK, A CORPORATION OF NEW YORK

SYNCHRONIZING CLOCK CONTROL SYSTEM

Application filed July 13, 1929. Serial No. 377,971.

At the present time clock synchronizing systems are employed wherein a master clock sends out the actuating impulses to secondary clocks and synchronization is effected between the various secondaries and the master. A common type of system employs three wires or two wires and a ground return intermediate the master clock and the various secondaries. For local installations where the clocks are relatively close to each other a so-called three wire system has the merit of simplicity and safety and in particular permits a simplified arrangement of the secondary clocks. Occasions, however, arise where it is desirable to control a group of secondary clocks at a distance remote from the master clock, say for example, at a distance of several miles or even greater distances. In such cases the cost of live wire becomes an important factor and also it may happen that a three wire system is already installed at one location and it is desired to connect it for control to another location at a distance from the first. It is accordingly advantageous to employ the smallest number of conductors and it is also desirable to provide for the additional service with the minimum number of disturbances and disarrangements of existing installation.

Accordingly it is the object of the present invention to provide means whereby a two wire circuit or simple circuit can be employed to connect a master clock controlling secondaries upon a three wire system with another group or groups of clocks at a distant point or points which latter clocks also operate upon a three wire system.

In the drawings:

Fig. 1 is a preferred and illustrative embodiment of the invention as shown; and Figs. 2 and 3 show modifications in which a different arrangement of batteries is employed.

The three wire synchronized impulse system which is employed including the arrangement of the essential controlling parts of the master clock and the arrangement of the secondaries is fully described in Bryce Patent #1,687,491 dated October 16, 1928 and need not be repeated here. It is sufficient to state that the parts to the left of the line M—N comprise the elements of the master clock in the aforesaid patent and include the relay coils 36 and 44 which are energized in the manner explained in the patent. The parts to the right of the right of dotted line R—S comprise a group of three wire type of impulse actuated secondaries, the clocks being marked X, Y and Z and operate in the identical manner to the secondaries described in the patent. Lines A', B' and C' are the controlling lines for a group of secondaries which are local with master clocks and correspond to A, B and C in the patent. A, B, C at the right are controlling lines for secondaries which are at a remote point.

In the diagram the single circuit lengthy line is shown at P and Q. While a metallic circuit is shown it will be obvious to those skilled in the art that a single wire such as P with a ground return could be employed.

Relay 36 operating its armature 38 sends minute impulses and also the fast impulses between the 59th and 60th minute over wire P. In order for this relay to send out impulses current must be supplied to armature 38. In lieu of going direct to wire 30 as heretofore, current is supplied from wire 30 through armature 41b of relay 44 and thence to 38, 41b remains in the position shown from the 60th minute to and including 44th minute as indicated by the master clock. As before stated, P receives minute impulses under control relay 36. These impulses flow from P through supplementary controlling devices disposed near the remotely located secondaries. The control devices will now be described.

Two relay coils 150 and 151 are located at the distant point and connected to the lines P and Q as shown. For simplicity they are shown connected in series but they could be in parallel if desired. Relay 150 has an armature 152 which when attracted establishes a circuit to line A. Relay coil 151 has an armature 153 which when attracted establishes a circuit to wire B. This latter relay is of the polarized type as indicated by the polarizing element 154 and is responsive to flow of current of one polarity.

Tracing the minute impulse flow from armature 88 the flow is as follows—over P through 150—151 wire Q back to armature 41a of relay 44 and thence back to wire 31 to the current source. Under these conditions with the circuit as described relays 150 and 151 will both respond and current impulses will be sent out over both the A and B wires and concurrently impulses will be sent over the A' and B' wires.

When the master clock passes the 44 minute coil 44 becomes energized elevating armatures 41, 41a and 41b to upper position. Armature 41 cuts off the flow of impulses to the B' wire. Armatures 41a and 41b when in upper position reverse the polarity of the supply of current to wires P and Q, 41a and 41b and the associated contacts and connections constitute a reversing switch. When the armatures are in raised position all impulses sent out under the influence of 38 are of reverse polarity and are ineffective to operate relay 151 but continue to operate relay 150 with the result that no impulses during this period go over wire B but impulses continue to go over wire A.

Preferably with a distance installation it is desirable to provide a local battery, this is shown at 155 connected in circuit as shown. Also with long lines it may be desirable to supply additional voltage and such additional voltage can be secured by utilizing a booster battery for example the battery 156 as shown in dotted lines. When this battery is employed such battery would be cut into line Q in series. This arrangement of supplementary batteries while preferable is not essential.

Figure 3:
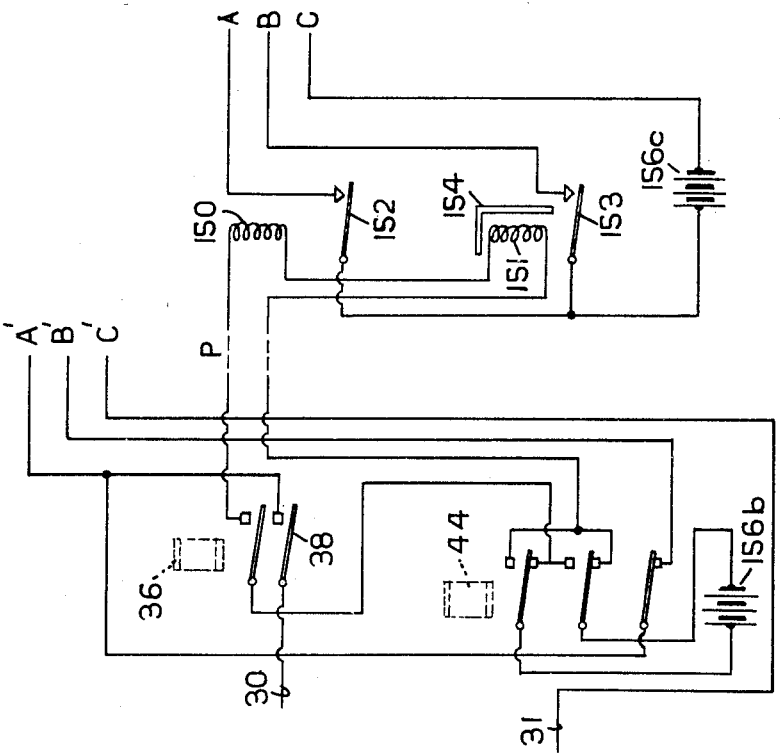
Fig. 3 shows another arrangement in which the current supply from the master clock is used for control of the local clocks over wires A', B' and C' and in which a separate battery 156b is used to control the distant relays and in which another battery 156c is used at the distant point to control the secondary clocks over the wires A, B, C.
Figure 2:
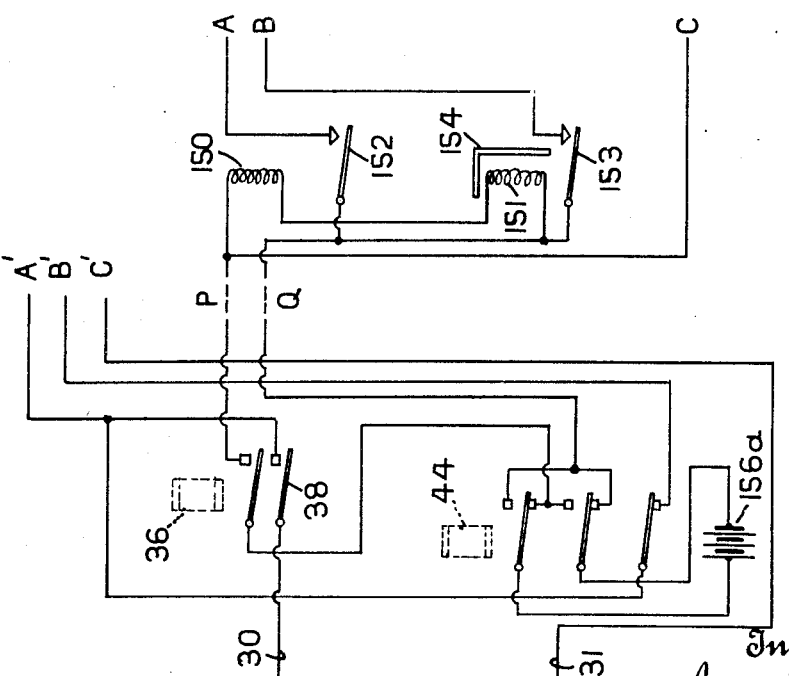
Fig. 2 shows an arrangement of circuit in which the current supply from the master clock is used for the control of the local clocks over wires A', B' and C' and in which a battery 156a is used at the master clock to drive and control the remote relays and the remote secondary clocks.

Obviously as before stated, a ground return could be used in place of the wire Q and Fig. 3 lends itself particularly to this sort of a system.

It will also be obvious to those skilled in telephone and telegraph practice that the wires P and Q can be used for transmission of intelligence in addition to their use in the electric clock system. Such results can be obtained by well known existing methods of superimposed circuit applications.

What I claim is:

1. A clock system including a master clock adapted for control of one or more secondary clocks over a plurality of wires greater than two, and one or more remote secondary clocks adapted for control in association with a multiple wire system including a plurality of conductors greater in number than two, an intermediate simple circuit between the said one or more remote secondaries and the master clock with means at the master clock for receiving the controlling impulses from the master clock and converting them in currents of two characteristics, and means at a point adjacent one or more of the remote secondaries for receiving the aforesaid currents, identifying the same and for sending out current impulses over the multiple wire system to the one or more secondary clocks.

2. In a clock system having a master clock of a type adapted to control and synchronize clocks over a three wire system, a secondary clock adaptable for control and synchronization by impulses received over a three wire system, and a three-wire system for said secondary clock, the combination of an interconnecting simple circuit into which identified impulses are transmitted by the master clock, and means for selecting the identified impulses and thereby controlling the subsequent transmission of impulses over the three wire circuits to the secondary clock.

3. In a clock system wherein a master clock is employed which is adaptable for sending actuating and synchronizing impulses over more than two wires and including in combination, impulse circuits of the more than two wire type, a single circuit, and means at the master clock for sending out over said single circuit actuating and synchronizing impulses which in point of time of transmission concur with the impulses which are sent out over the impulse circuits of the more than two wire type but which in character are identifiable so as to be capable of being transmitted over the two wires of the single circuit and identified upon receipt.

4. A clock system including a multiple wire system for secondary clock synchronization and actuation, in combination with a single circuit system extending to a remote master clock, and means for receiving controlling impulses from the single circuit system and for imparting corresponding chronological impulses to the multiple wire system.

5. A clock system including a master clock, a single circuit system extending therefrom to a remote point, a multiple wire secondary clock system at such remote point, means at the master clock for transmitting current impulses of identifiable characteristics over the single circuit, and means at the remote point for receiving and identifying the transmitted impulses and for re-transmitting the identified impulses over the multiple wire secondary clock system.

In testimony whereof I hereto affix my signature.

JAMES W. BRYCE.

DISCLAIMER 1,908,112.—*James W. Bryce*, Bloomfield, N. J. SYNCHRONIZING CLOCK CONTROL SYSTEM. Patent dated May 9, 1933. Disclaimer filed May 19, 1938, by the assignee, *International Business Machines Corporation*.

Hereby enters this disclaimer to claims 4 and 5 in said specification.

[*Official Gazette June 14, 1938.*]